United States Patent [19]

Westerdale

[11] Patent Number: 5,180,262
[45] Date of Patent: Jan. 19, 1993

[54] ADJUSTABLE CHAIN VEHICLE TIE-DOWN APPARATUS

[76] Inventor: Norman R. Westerdale, 45546 Emerald Forest Dr., Novi, Mich. 48374

[21] Appl. No.: 705,853

[22] Filed: May 28, 1991

[51] Int. Cl.⁵ .............................................. B60P 7/08
[52] U.S. Cl. ........................................ 410/12; 410/23
[58] Field of Search ................... 410/3, 4, 7, 8, 9, 10, 410/11, 12, 19, 23, 24, 24.1, 25, 26, 27, 28, 28.1, 29, 29.1; 414/563; 24/68 CD, 68 CT

[56] References Cited

U.S. PATENT DOCUMENTS

| | | | |
|---|---|---|---|
| 2,969,023 | 1/1961 | Chapman | 410/12 |
| 2,970,850 | 2/1961 | Blunden | 410/23 |
| 3,039,813 | 6/1962 | Risner | 410/28.1 |
| 3,059,500 | 10/1962 | Schneiter | 74/575 |
| 3,138,030 | 6/1964 | Godel | 74/159 |
| 3,140,850 | 7/1964 | Packard | 248/361 |
| 3,626,452 | 12/1971 | Winter et al. | 74/143 |
| 3,679,175 | 7/1972 | Drayton | 410/23 |
| 3,685,856 | 8/1972 | Blunden | 410/12 |
| 3,860,263 | 1/1975 | Taylor | 410/12 |
| 4,193,349 | 3/1980 | Allen | 410/7 |
| 4,273,484 | 6/1981 | Blanar | 410/12 |
| 4,316,686 | 2/1982 | Cottrell et al. | 410/23 X |
| 4,606,687 | 8/1986 | Mantela et al. | 410/23 |

Primary Examiner—Frank E. Werner
Assistant Examiner—James Eller
Attorney, Agent, or Firm—Krass & Young

[57] ABSTRACT

A tie-down system for securing vehicles to the ramps of a vehicle-hauling trailer includes a hollow winch axle extending transversely across the ramp and a chain extending through the winch axle. The winch axle has a chain-engaging end on one side of the ramp for selectively engaging the chain, and a gear-supporting end with a two-way gear/pawl arrangement for selectively locking the winch axle with respect to the ramp. An elastomeric bushing is disposed on the winch axle between the winch axle and the ramp structure to absorb peak chain loads during use. A novel ladder arrangement formed on the ramp adjacent the chain-engaging end of the winch axle permits the chain to be threaded therethrough laterally with respect to the ramp to position the chain at a desired angle with respect to the vehicle.

15 Claims, 3 Drawing Sheets

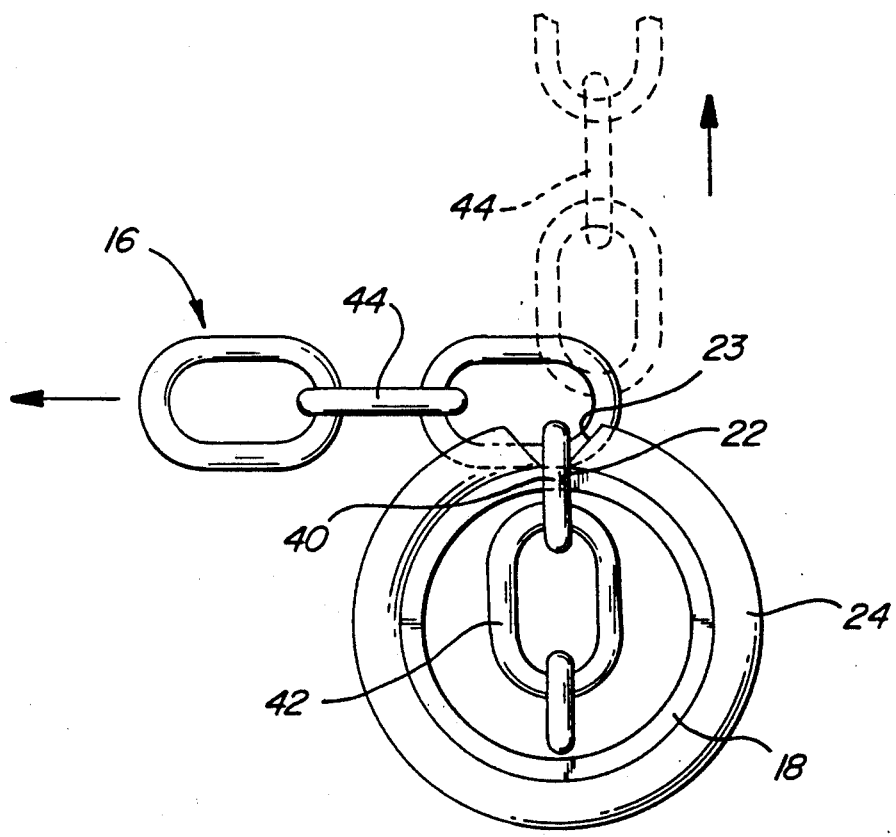
FIG - 3
FIG - 4
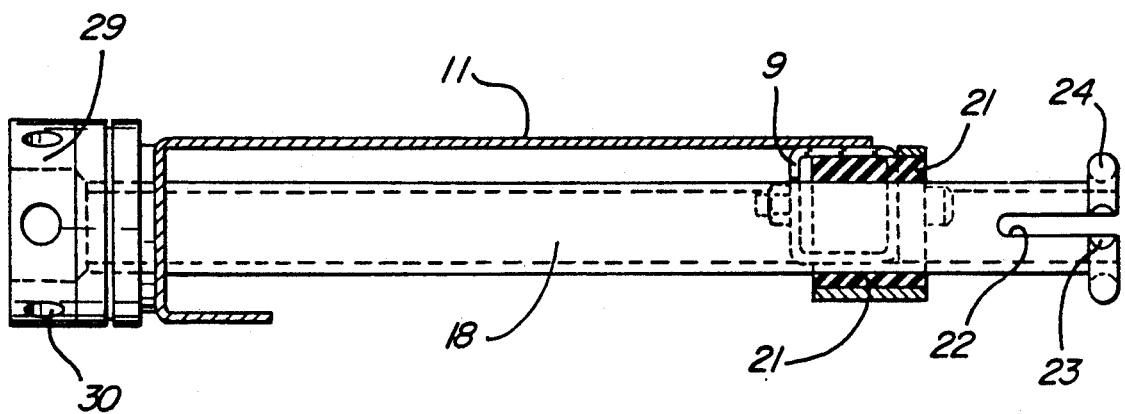

ADJUSTABLE CHAIN VEHICLE TIE-DOWN APPARATUS

FIELD OF THE INVENTION

The present invention is an improved tie-down system for securing vehicles to the ramps of vehicle hauling trailers by way of an adjustable chain.

BACKGROUND OF THE INVENTION

Vehicle hauling trailers typically have two long vehicle ramps onto which the vehicles being hauled are driven and secured. Securing the vehicle on the ramp is extremely important to keep the vehicle from swaying and bouncing during transit.

The preferred method in the industry for securing the vehicle to the ramps is with heavy-gauge chain, and modern automobiles are equipped by the manufacturer with special receptacles in their frames to which such chains can be attached, usually by way of hooks. The other end of each chain is attached, by welding or with suitable fasteners, to a winch axle extending transversely across or under the ramp. One end of each winch axle extends from the side of the ramp, and is provided with a gear and pawl arrangement into which a handle or lever, for example, a tire iron, can be inserted to rotate the winch axle and tighten the chain hooked to the vehicle. There are usually four such winch axles and associated chains per vehicle. Examples of such tie-down systems are disclosed in U.S. Pat. No. 3,053,508 to Schultz, U.S. Pat. No. 3,566,804 to Mietla, U.S. Pat. No. 4,147,113 to Kilgus, and U.S Pat. No. 4,273,484 to Blanar.

Because a single trailer is typically used to haul a variety of vehicles having different sizes and configurations, the length of the chain becomes a critical factor. Chains must be long enough to secure the largest vehicle which might possibly be carried on the trailer. However, when shorter vehicles are loaded there remains a substantial excess length of chain which must be stored securely to prevent it from swinging around during loading and transit and damaging the vehicles on the trailer. With the heavy gauge chain used to secure the vehicles it frequently occurs that not all of the excess chain can be wound about the winch axle. Prior art solutions to this problem include providing the chain with a secondary hook to cinch up the extra length of chain, or providing a number of chains of different lengths. The first solution still leaves the cinched or excess portion of chain to hang and sway, especially during the loading procedure. The second method is not economical and requires an inordinate amount of time for changing each chain on each winch axle.

Another feature incorporated in older tie-down systems is a ladder-like structure extending laterally between ramps. Many vehicle manufacturers require that vehicles be tied down utilizing restraints disposed at a specified angle. The ladder provides a convenient structure for maintaining the proper angle with respect to the ramp at which the chain exerts tension on the vehicle to hold it motionless on the ramp. Each chain is threaded between the bars of the ladder to a point adjacent the hook-receiving frame receptacle, and then partially encircles one of the bars in the ladder upwardly toward the receptacle and hooked in place. A problem with prior ladder structure is that the over and under threading of the chain through the bars is inconvenient for the operator and creates the possibility of damage to the vehicles when the chain is dropped between the bars of the ladder, either accidently or for the purpose of threading it therethrough. Such prior art ladder structure is disclosed in U.S. Pat. No. 4,273,484 to Blanar.

SUMMARY OF THE INVENTION

The present invention is an improved tie-down system for adjusting, positioning, securing and storing the chain used to fasten the vehicle to the ramp. A rotatable winch axle for tightening the chain connected to the vehicle extends transversely through or under the ramp such that one end projects laterally from each side of the ramp. The winch axle has a chain-engaging end in which the chain can be selectively engaged, enabling the operator to adjust the length of the chain extending from the axle to the proper length for each type of vehicle on the ramp. The winch axle itself is hollow, and the chain runs through the hollow axle and extends from both ends. As much chain as needed is pulled out through the chain-engaging end of the hollow axle, and then engages with the chain-engaging end to thereby fix the length of chain that the operator has to work with and secure the chain to the winch axle for tensioning.

The opposite end of the winch axle is provided with locking means to selectively prevent rotation of the winch axle in either or both directions. In one embodiment of the invention, the locking means comprise a gear having two sets of opposed gear teeth and a two-way pawl arrangement selectively engagable with the gear to limit rotation of the axle to either the counter-clockwise or clockwise direction, or to lock the axle in both directions.

In a preferred embodiment of the invention, the chain-engaging end of the hollow axle includes a slot extending from the chain engaging end toward the opposite end. The chain can be selectively axially engaged with the slot to radially lock the chain to the chain-engaging end of the axle so that the length of chain extending from the chain-engaging end can be fixed at the required length. Thus, when the chain is disengaged from the slot it can be pushed or pulled freely through the hollow axle; when the chain is engaged in the slot it is radially locked with respect to the axle. Rotation of the winch axle when the chain is in the slot serves to further axially lock the chain with respect to the axle. Using the present invention, the winch axle may be rotated in either direction to facilitate the securing of vehicles by allowing the chain to extend in either direction from the winch axle. In this manner, a long length of chain can be selectively adjusted to the lengths needed for different vehicles. Excess chain is stored securely out of the way in the hollow axle and on the opposite side of the ramp where it cannot swing and damage the vehicles on the trailer.

The slot in the chain-engaging end is preferably of a width approximately equal to the diameter of the links in the chain. The chain can then be adjusted in link-by-link increments to ensure that the proper amount of chain is used every time.

Another feature of the invention is the ladder arrangement in which the length of chain extending from the chain-engaging end of the axle can be threaded between the bars of the ladder laterally from the side of the ramp. This substantially eliminates the tendency of the chain to be dropped or to fall through the bars of the ladder onto a vehicle when the chain is threaded through the ladder, and is far more convenient for the person threading the chain.

In the preferred embodiment, the ladder comprises a plurality of spaced T-bars extending from the side of the ramp adjacent the chain-engaging end of the hollow axle. The space between the cross bars of the T-bars permits the chain to be easily threaded through the ladder from the side with respect to the ramp, which is easier for the operator and less likely to result in damage from a dropped or falling chain.

In the preferred embodiment, the tie-down system further includes an elastomeric bushing connected to the tightening means proximate the chain-engaging end so as to dampen peak chain loads. This bushing is preferably disposed operatively on the tightening means between the tightening means and the ramp to dampen the peak chain loads applied to the subframe at the tie-down location due to relative movement between the ramp 10 and vehicle occasioned by rough roads or the like.

Other features and embodiments of the invention will become apparent upon further reading of the specification.

BRIEF DESCRIPTION OF THE DRAWINGS

FIG. 3 is an end view of the chain-engaging end of the winch axle of the present invention; and FIG. 4 is a sectional view of the present invention mounted on a section of a ramp of a vehicle hauling trailer taken along line 4—4 in FIG. 2.

DETAILED DESCRIPTION OF THE DRAWINGS

Figure 1:
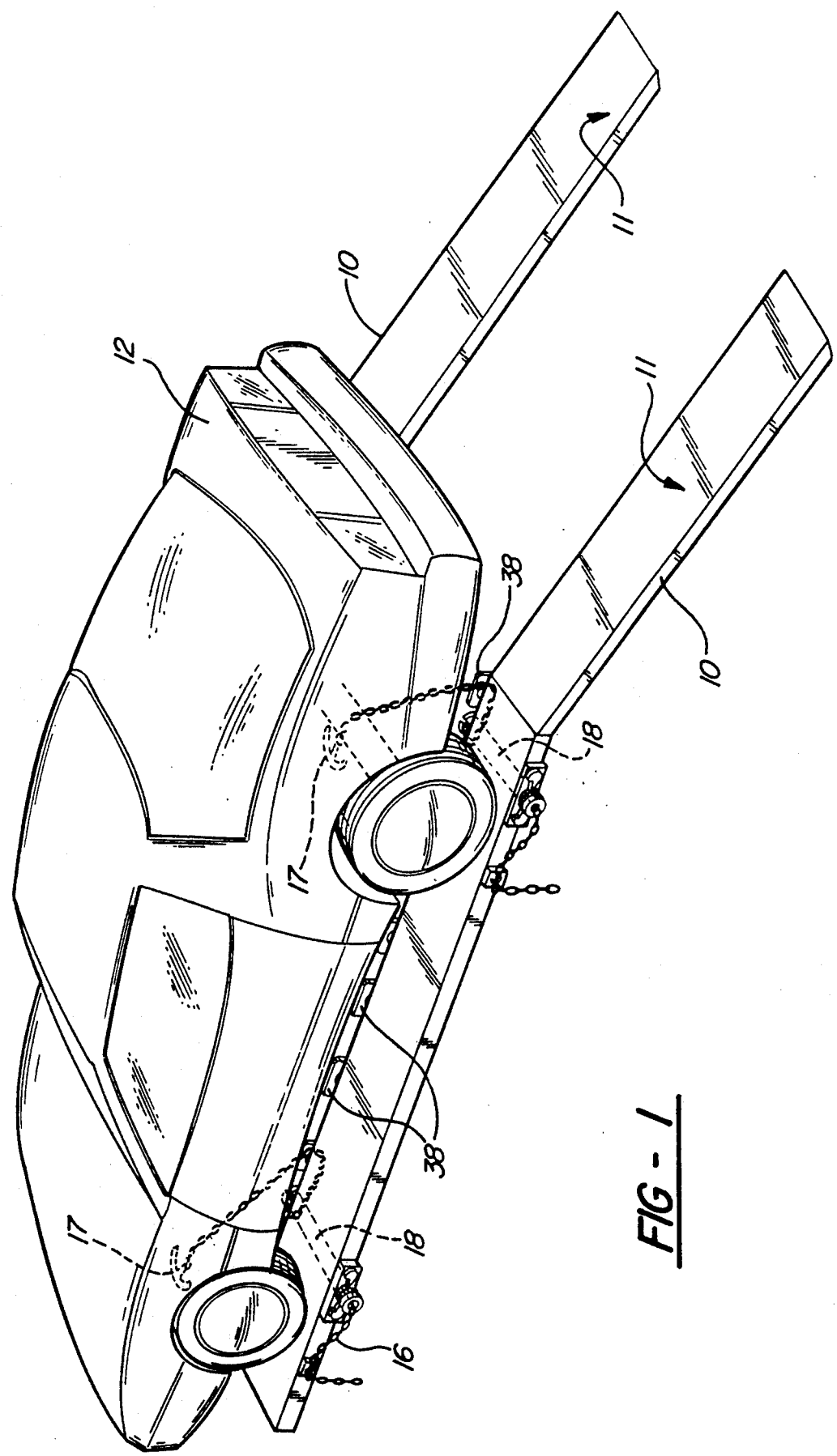
FIG. 1 is a perspective view of the present invention mounted on the ramp of a vehicle hauling trailer and securing a vehicle to the ramp.

Referring to FIG. 1, the ramps 10 of a vehicle hauling trailer are shown supporting a vehicle 12. Ramps 10 are parallel with respect to one another, and are spaced apart a sufficient distance to accommodate the tires of the vehicle 12 so that the vehicle can be driven onto the ramps. A number of tie-down systems according to the present invention are mounted on ramps 10 such that two tie-down systems are disposed on each ramp to provide four tie down systems for each vehicle to be transported. Each tie-down system generally comprises a chain 16 connected at one end to a receptacle on the vehicle subframe (not shown) by suitable fastener means 17 and engaged by a winch axle 18 that shortens or lengthens the portion of chain 16 between winch axle 18 and vehicle 12. To secure vehicle 12 to ramps 10, chains 16 are connected to the various frame receptacles, for example by hooks, and winch axles 18 are rotated to wind up any slack in chain 16 and tension vehicle 12 downwardly onto ramps 10. The use of four such tie-down systems for each vehicle 12, as previously described, substantially eliminates swaying and bouncing of vehicle 12 on ramps 10 when the vehicle hauling trailer is in transit, preventing damage to both vehicle 12 and the trailer.

It can be seen in FIG. 1 that a number of T-bars together comprising ladder 38 project outwardly along the length of a frame member 9 of ramps 10 on the side of the ramps where chain 16 extends from winch axle 18 to the receptacles in the vehicle frame. Chains 16 are threaded through and around the T-bars of ladder 38 so that the end portion of chain 16 extending from the ladder to the receptacle in the frame of vehicle 12 is at a predetermined angle with respect to the ramp 10, here approximately 45 degrees. The angle at which chain 16 finally extends to vehicle 12 from ladder 38 depends on the position of the last bar in ladder 38 about which the chain is threaded with respect to the receptacle in the vehicle frame. The angle may accordingly be varied by the operator as desired by wrapping chain 16 around different T-bars in ladder 38.

Figure 2:
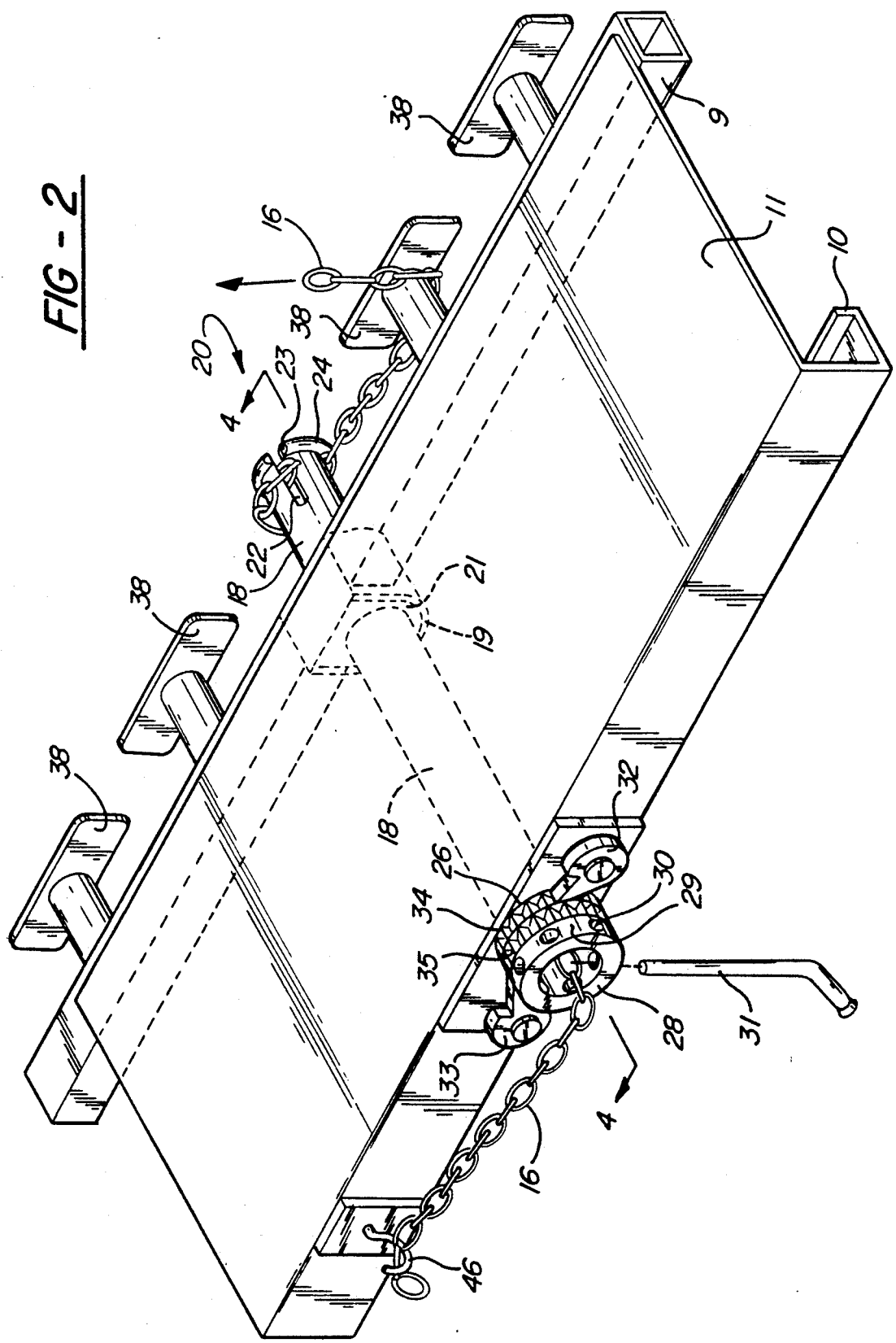
FIG. 2 is a close-up perspective view of the present invention mounted on a section of a ramp of a vehicle hauling trailer.

With reference also to FIG. 2, the tie-down system of the present invention is shown in more detail. Winch axle 18 is mounted transversely across and below the surface 11 of ramp 10, supported by a generally rectangular, hollow support bracket 19 welded or mechanically fastened to the ramp 10. Winch axle 18 is hollow and includes a chain-engaging end 20 projecting from one side of ramp 10, and a gear-supporting end projecting from the opposite side of the ramp. Winch axle 18 is rotatable within support bracket 19, for example on bushings or bearings (not shown) in a well-known manner.

With reference also to FIG. 4, an elastomeric bushing 21, formed of rubber or other suitable material, is disposed between the chain end of winch axle 18 and frame member 9 of the ramp 10 to dampen the peak chain loads applied to the subframe at the tie-down location due to relative movement between the ramp 10 and vehicle occasioned by rough roads or the like. Winch axle 18 is preferably made of a high-strength metal such as steel, although other suitable materials will be apparent to those skilled in the art.

The chain-engaging end 20 of winch axle 18 includes a slot 22 open at the end of axle 18 and extending axially inward toward the gear-supporting end of the axle. Slot 22 communicates with the hollow interior of axle 18. An enlarged diameter radial collar 24 is formed about the circumference of chain-engaging end 20, either integrally cast with the collar or added on separately by welding or another suitable method, and is interrupted by slot 22 as shown at 23. The interruption 23 in collar 24 corresponds to the width of the slot 22 immediately adjacent the outer surface of winch axle 18, and is beveled to progressively widen radially outward of slot 22 for purposes to be hereinafter described. Additionally, the wall of hollow axle 18 in the area adjacent slot 22 is preferably heat-treated to increase its strength and wear-resistance.

The opposite gear-supporting end of winch axle 18 has a gear 26 fastened thereto adjacent the side wall of ramp 10, and a collar 28 axially outward of gear 26. Gear 26 and collar 28 may be integrally cast with either the winch axle 18, or with each other and fastened to winch axle 18, or separately fastened to winch axle 18, so long as they are fixed with respect to the axle. Collar 28 has a number of sockets 30 formed in wall 29 and spaced evenly about its circumference. Sockets 30 are sized to permit a conveniently sized lever arm or handle, for example a tire iron 31, to be inserted therein for rotating collar 28, gear 26 and winch axle 18. Sockets 30 preferably extend completely through wall 29, and radially opposing sockets are preferably aligned, so that tire iron 31 can be inserted completely through collar 28 as shown.

A two-way pawl arrangement comprising two opposing pawls 32, 33 pivotably mounted on the side wall of ramp 10 adjacent gear 26 are provided to engage opposing sets of gear teeth 34, 35 on gear 26. Each pawl 32, 33 and its related set of teeth on gear 26 operates to limit winch axle 18 to one direction of rotation, i.e., pawl 32 and gear teeth 34 are arranged to permit only clockwise rotation of the axle, and pawl 33 and gear teeth 35 are arranged to permit only counterclockwise rotation of the axle. Pawls 32, 33 may be spring or gravity-biased into engagement with gear teeth 34, 35, but can be selectively swung out of engagement with gear 26 to permit rotation of winch axle 18 in one direction or the other. When both pawls 32, 33 engage their respective sets of gear teeth 34, 35, the axle 18 is locked with respect to ramp 10 and cannot rotate in either direction.

Although the illustrated embodiment discloses the use of two opposing pawls for selectively limiting the direction of rotation of winch axle 18, other equivalent pawl arrangements are within the scope of the invention. For example, a single, two-prong pawl having off-set prongs for engaging gear teeth 34, 35 can be used in place of opposing pawls 32, 33.

Referring now to both FIGS. 2 and 3, chain 16 extends through hollow winch axle 18, exiting chain-engaging end 20 via slot 22 and exiting the opposite gear-supporting end. Slot 22 is cut to a width approximately equal to the diameter of the material used in the links of the chain so that, as shown in FIG. 3, link 40 turned sideways to slot 22 slides axially with respect to the winch axle in the slot. Once inserted, chain 16 is locked radially with respect to slot 22 due to the 90 degree difference in orientation between link 40 in the slot and neighboring links 42, 44.

The radially outward bevel in collar 24 at the open end of slot 22 permits link 40 in chain 16 to be axially inserted in slot 22. Although the midpoint of link 40 is no wider than slot 22 when turned sideways, intersecting link 44 above the slot has an effective width much greater than link 40, due to its 90-degree difference in orientation. The interruption 23 in collar 24 is sufficiently beveled to permit link 44 to pass axially inward of collar 24 along with link 40, as long as link 44 is maintained in the vertical position shown in phantom in FIG. 3. As soon as the portion of chain 16 extending from chain-engaging end 20 of axle 18 is angled away from the vertical, upper link 44 is rotated out of alignment with interruption 23 and chain 16 is effectively radially and axially locked with respect to slot 22.

Referring again to FIG. 2, a number of storage hooks 46 are mounted on the outside (or gear side) of ramp 10 to secure the free end of chain 16 extending from the gear-supporting end of axle 18. Hooks 46 are provided to accommodate varying lengths of the free end of chain 16 since the length of free chain will vary depending on the amount of chain used to anchor a vehicle onto ramps 10. Alternatively, hooks 46 can be replaced by a storage box or similar enclosure (not shown) for securely holding the free end of the chain.

In operation, an operator loading vehicles onto the trailer first drives a vehicle onto ramps 10 to the desired position. Chain 16 at this point may be safely stored on hooks 46, in the interior of hollow axle 18 and fastened in slot 22. The operator disengages chain 16 from slot 22 by merely rotating link 44 immediately above slot 22 to the vertical position shown in phantom in FIG. 3 and sliding the chain out of slot 22 through interruption 23. An appropriate amount of chain 16 is then fed through the gear end of axle 18, pulled out through chain-engaging end 20 and threaded between the T-bars of ladder 38 laterally with respect to the ramp. When the operator reaches a T-bar in the ladder 38 positioned at a desired angle with respect to the vertical from the receptacle in the vehicle frame in which chain 16 is to be fastened, the operator simply angles the chain 16 around that T-bar up to the receptacle and hooks or otherwise fastens it in place.

At this point there will typically be some slack in chain 16 between the vehicle to which it is connected and winch axle 18. In order to put tension on chain 16 and tighten the vehicle down on the ramps 10, the operator manually adjusts the length of chain between the chain-engaging end 20 and the vehicle 16 by pulling chain 16 back through winch axle 18 toward the outside of the trailer. In this manner, chain 16 can be adjusted link-by-link to hand-tighten the chain 16. When all available slack has been removed by hand, chain 16 is inserted in slot 22 and a tire iron 31 is then inserted in holes 30 in collar 28 on the opposite side of the ramp to rotate winch axle 18 and ratchet winch axle 18 in a direction to further tighten the length of chain 16 connected between the vehicle on the ramp and axle winch 18. The pawl/gear arrangement comprising pawls 32, 33 and gear teeth 34, 35 can be selectively set by the operator to wind or unwind chain 16 about the opposite end of axle 18. When the proper amount of chain 16 has been wound or unwound about axle 18 to achieve the desired tension, the operator then engages both of pawls 32, 33 with gear teeth 34, 35 to lock the axle in position with respect to the ramp. Excess chain extending from the gear-supporting end of axle 18 can then be stored on hooks 46 or similar storage means provided on the gear side of the ramp.

Winding chain 16 about the chain-engaging end 20 of axle 18 in the manner previously described automatically serves to rotate chain link 44 out of alignment with interruption 23 in collar 24 to axially lock chain 16 into slot 22.

From the above it can be seen that the present tie-down system permits the tensioning and securing of vehicles on the trailer ramps in a safe, convenient and efficient manner using a length of chain long enough to accommodate any size vehicle, while simultaneously reducing the danger of damage to the vehicle by excess, unsecured sections of chain. It is to be understood that the foregoing is a description of an illustrative embodiment of the invention in accordance with 35 USC 112, and is not intended to be limiting, as many modifications and variations of the invention lie within the scope of the claims.

I claim:

1. An improved tie-down system for securing a vehicle to a ramp of a vehicle-hauling trailer, comprising:
   chain means for securing the vehicle to the ramp;
   tightening means mounted on the ramp and connectable to the chain means for adjusting the length of the chain means with respect to the vehicle, the tightening means comprising a rotatable hollow winch axle extending transversely across the ramp, including a first chain-engaging end on one side of the ramp for selectively engaging the chain means to connect the chain means to the tightening means and to permit adjustment of the length of the chain means with respect to the tightening means, and a second end on the other side of the ramp, said chain means extending through said hollow winch axle from said first end to said second end;

ladder means on the ramp for positioning a portion of the chain means extending from the chain-engaging end at a desired angle with respect to the vehicle on the ramp; and locking means on the ramp for locking the tightening means against rotation with respect to the ramp.

2. A tie-down system as defined in claim 1, wherein the chain means is movable into and out of engagement with the ladder means laterally with respect to the ramp.

3. A tie-down system as defined in claim 1, including storage means on the ramp adjacent said second end of the winch axle opposite the chain engaging end for securing a free end of the chain means.

4. A tie-down system as defined in claim 1, wherein the locking means comprise a gear mounted on said second end of the hollow winch axle, and a two-way pawl on the ramp for selective engagement with the gear.

5. A tie-down system as defined in claim 1, including radial locking means for radially locking the chain means with respect to the hollow winch axle when the chain means is axially engaged with the chain engaging end, and axial locking means for axially locking the chain means with respect to the hollow winch axle when the length of the chain means is adjusted with respect to the vehicle.

6. A tie-down system as defined in claim 1, wherein an elastomeric bushing is connected to the tightening means proximate the chain-engaging end so as to dampen peak chain loads.

7. A tie-down system as defined in claim 6, wherein said elastomeric bushing is operatively disposed on the tightening means between the tightening means and the ramp.

8. An improved tie-down system for securing a vehicle to a ramp of a vehicle-hauling trailer, comprising:

chain means for attaching the vehicle to the ramp;

tightening means comprising a rotatable hollow winch axle extending transversely across the ramp, having a first chain-engaging end on one side of the ramp and a second gear-supporting end on the other side of the ramp, the chain means extending through said hollow winch axle from said first end to said second end;

ladder means projecting from the ramp adjacent the chain-engaging end for positioning a portion of the chain means extending from the chain-engaging end at a desired angle with respect to the vehicle on the ramp;

locking means on the ramp comprising a two-way pawl arrangement for selectively engaging a gear mounted on the gear-supporting end of the hollow axle; and slot means formed in the chain-engaging end for selectively radially and axially locking the chain means to the tightening means.

9. A tie-down system as defined in claim 8, wherein said ladder means comprise a plurality of spaced T-bars extending from and lying in the plane of the ramp, such that the chain means extending from the chain-engaging end can be threaded into and out of engagement with the T-bars laterally with respect to the ramp.

10. A tie-down system as defined in claim 8, wherein said slot means extends from the chain-engaging end of the hollow axle toward the gear-supporting end, and has a width corresponding approximately to the diameter of a link in the chain to permit link-by-link adjustment of the length of the chain means with respect to the chain-engaging end of the hollow axle.

11. A tie-down system as defined in claim 10, wherein said chain engaging end includes an enlarged diameter radial collar extending substantially about the circumference of the hollow axle outboard of the chain means to prevent the chain means from inadvertently sliding out of the slot means.

12. A tie-down system as defined in claim 11, wherein said radial collar includes an interruption aligned with said slot means and beveled radially outward from said chain-engaging end.

13. A tie-down system as defined in claim 8, including storage means on the ramp adjacent the gear-supporting end of the winch axle for securing a free end of the chain means.

14. A tie-down system as defined in claim 8, wherein an elastomeric bushing is connected to the tightening means proximate the chain-engaging end so as to dampen peak chain loads.

15. A tie-down system as defined in claim 14, wherein said elastomeric bushing is operatively disposed on the tightening means between the tightening means and the ramp.

* * * * *